US011998856B2

(12) United States Patent
Gebhardt et al.

(10) Patent No.: US 11,998,856 B2
(45) Date of Patent: Jun. 4, 2024

(54) CONICAL-SHAPED ARTICULATED MEMBER

(71) Applicant: UNIVERSAL CITY STUDIOS LLC, Universal City, CA (US)

(72) Inventors: Michael James Gebhardt, Winter Garden, FL (US); Clarisse Vamos Falls, Orlando, FL (US); Carissa Richele Vance, Orlando, FL (US); Anisha Vyas, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 49 days.

(21) Appl. No.: 17/530,307

(22) Filed: Nov. 18, 2021

(65) Prior Publication Data

US 2022/0178426 A1 Jun. 9, 2022

Related U.S. Application Data

(60) Provisional application No. 63/121,805, filed on Dec. 4, 2020.

(51) Int. Cl.
*F16H 21/52* (2006.01)
*A63H 31/08* (2006.01)
*A63J 19/00* (2006.01)

(52) U.S. Cl.
CPC ............ *A63H 31/08* (2013.01); *A63J 19/006* (2013.01)

(58) Field of Classification Search
CPC ......... A63H 13/02; A63H 31/08; B25J 9/065; B25J 9/06; A63J 9/006
See application file for complete search history.

(56) References Cited

U.S. PATENT DOCUMENTS

| 5,297,443 | A | | 3/1994 | Wentz |
| 5,428,713 | A | * | 6/1995 | Matsumaru ............ B25J 9/1615 700/262 |
| 5,498,193 | A | | 3/1996 | Locricchio |

(Continued)

FOREIGN PATENT DOCUMENTS

| CN | 105729500 A | 7/2016 |
| KR | 101341083 B1 | 12/2013 |

OTHER PUBLICATIONS

Rone, William S. et al. "Controller Design, Analysis, and Experimental Validation of a Robotic Serpentine Tail to Maneuver and Stabilize a Quadrupedal Robot." Journal of Dynamic Systems, Measurement, and Control (2019), vol. 141: pP. 081002-1 to 081002-9.

(Continued)

*Primary Examiner* — Gregory Robert Weber
(74) *Attorney, Agent, or Firm* — LOZA & LOZA, LLP; Lew Edward V. Macapagal

(57) ABSTRACT

Aspects of the disclosure relate to a conical-shaped articulated member. The conical-shaped articulated member includes a conical-shaped structure including an inner surface and an outer surface. The conical-shaped articulated member further includes a plurality of rotary actuation units disposed along a length of the conical-shaped structure, where at least two rotary actuation units of the plurality of rotary actuation units are coupled together. The plurality of rotary actuation units are configured to perform one or more motions.

20 Claims, 10 Drawing Sheets

(56) References Cited

U.S. PATENT DOCUMENTS

| | | | |
|---|---|---|---|
| 6,220,922 B1* | 4/2001 | Lee | A63H 3/46 |
| | | | 446/385 |
| 7,819,719 B2* | 10/2010 | Tye | B62D 57/032 |
| | | | 446/268 |
| 8,272,918 B2 | 9/2012 | Lam | |
| 8,291,788 B2 | 10/2012 | Ihrke et al. | |
| 9,796,092 B2* | 10/2017 | Sato | B25J 17/0275 |
| 10,576,622 B2* | 3/2020 | Hutson | B25J 17/0258 |
| 10,695,684 B1* | 6/2020 | Greenley | A63H 3/00 |
| 10,751,872 B2* | 8/2020 | Pettersen | B25J 9/065 |
| 2004/0219861 A1 | 11/2004 | Madhani et al. | |
| 2007/0021032 A1 | 1/2007 | Tye et al. | |
| 2019/0152063 A1* | 5/2019 | Hayashi | B25J 18/005 |

OTHER PUBLICATIONS

International Search Report and Written Opinion, PCT/2021/060078, dated Feb. 8, 2022, 8 pgs.

\* cited by examiner

CONICAL-SHAPED ARTICULATED MEMBER

CROSS REFERENCE TO RELATED APPLICATION(S)

This application claims the benefit of U.S. Provisional Application Ser. No. 63/121,805, entitled "CONICAL-SHAPED ARTICULATED MEMBER" and filed on Dec. 4, 2020, which is expressly incorporated by reference herein in its entirety.

TECHNICAL FIELD

The technology discussed below relates generally to articulated members, and more specifically to a conical-shaped articulated member.

INTRODUCTION

Electro-mechanically animated figures may be used in theme park attractions (e.g., rides or shows), restaurants, or other venues to enhance a user experience. These animated figures, for example, may be three-dimensional models of humans, animals, or other types of creatures (e.g., fictional creatures). In some examples, existing actuation systems for animating figures (or animating parts of figures) may involve the use of cables configured to perform the desired movements for the animated figures. However, the use of such cables may significantly increase costs, design complexity, and/or the failure modes of the animated figures. Moreover, these cables may be difficult to maintain and may reduce the longevity of the animated figures.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are related to a conical-shaped articulated member and a method for constructing a conical-shaped articulated member. In one example, the conical-shaped articulated member includes a conical-shaped structure including an inner surface and an outer surface. The conical-shaped articulated member further includes a plurality of rotary actuation units disposed along a length of the conical-shaped structure, where at least two rotary actuation units of the plurality of rotary actuation units are coupled together. The plurality of rotary actuation units are configured to perform one or more motions.

In one example, a method for constructing a conical-shaped articulated member includes forming a conical-shaped structure including an inner surface and an outer surface. The method further includes coupling a plurality of rotary actuation units to one another, where the plurality of rotary actuation units configured to perform one or more motions. The method further includes disposing the plurality of rotary actuation units along a length of the conical-shaped structure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and/or packaging arrangements.

Figure 1:
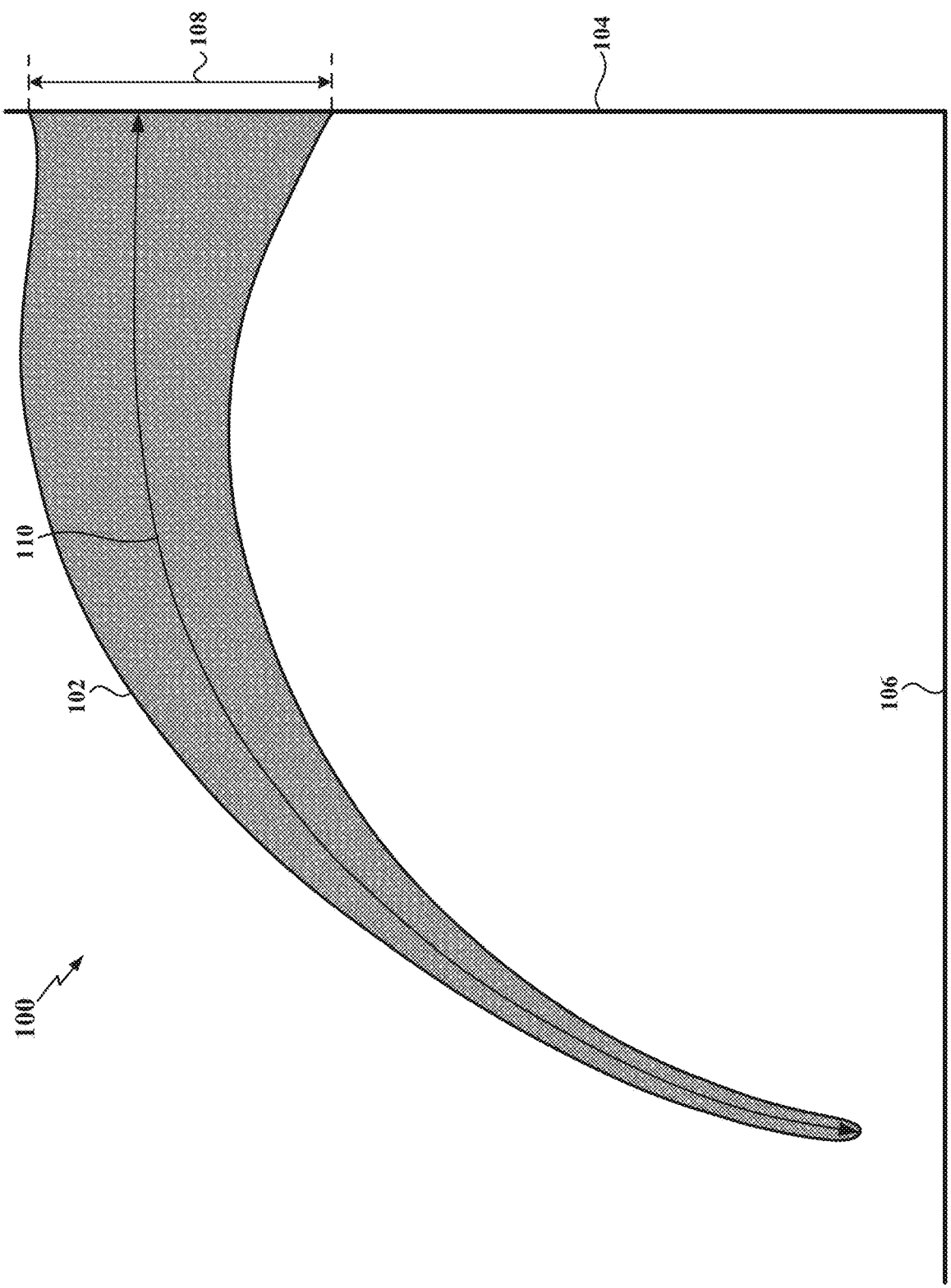
FIG. 1 illustrates a side view of a conical-shaped articulated member in accordance with various aspects of the present disclosure.

Aspects of the present disclosure are related to a conical-shaped articulated member. FIG. 1 illustrates a side view of a conical-shaped articulated member 100 in accordance with various aspects of the present disclosure. In the aspects described herein with reference to FIGS. 1-8, the conical-shaped articulated member (e.g., the conical-shaped articulated member 100, 800) is implemented as an articulated animal's tail capable of achieving different types of animal tail motions (also referred to as animal tail movements). In the aspects described herein with reference to FIG. 9, the conical-shaped articulated member (e.g., the conical-shaped articulated member 900) is implemented as an articulated vine. It should be understood, however, that the mechanisms and/or structures for the conical-shaped articulated members described herein may be applied to implementations different from those described with reference to FIGS. 1-9.

In some examples, and as shown in FIG. 1, the conical-shaped articulated member 100 may be mounted to a surface 104 to create an illusion where the body of an animal (e.g., to which the conical-shaped articulated member 100 belongs) appears to be inside a partially enclosed space (e.g., a cave) and hidden from view, while its tail protrudes from an opening of the partially enclosed space and remains visible. In some examples, the conical-shaped articulated member 100 may be suspended above a floor 106.

In some example implementations, the conical-shaped articulated member 100 may include a conical-shaped structure 102. For example, the conical-shaped structure 102 may be a shell formed using durable yet lightweight materials, such as a fiber reinforced plastic (FRP), a hard shell composite plastic, a three-dimensional printed part, and/or any other suitable materials. The shell may include inner and outer surfaces, for example. In some examples, the conical-shaped structure 102 may include a silicone skin or other flexible material that simulates one or more physical characteristics (e.g., textures, colors, etc.) appropriate for the type of articulated member (e.g., an animal's tail, a vine, etc.). In some examples, one or more bladders may be coupled to the outer surface of the conical-shaped structure 102. For example, the bladders may be filled with a gas (e.g., air), a liquid, a solid material, or combinations thereof to achieve an appropriate effect for the conical-shaped structure 102.

In some aspects of the disclosure, and as shown in FIG. 1, the conical-shaped structure 102 of the conical-shaped articulated member 100 may have a width 108 that tapers down along a length 110 of the conical-shaped structure 102. For example, the width 108 may be within a range of 12 inches to 24 inches. In other examples, the width 108 may be less than 12 inches or greater than 24 inches. For example, the length 110 may be within a range of six feet to 15 feet. In other examples, the length 110 may be less than six feet or greater than 15 feet. The components and operation of the conical-shaped articulated member 100 are described in detail herein with reference to FIGS. 2-7.

Figure 2:
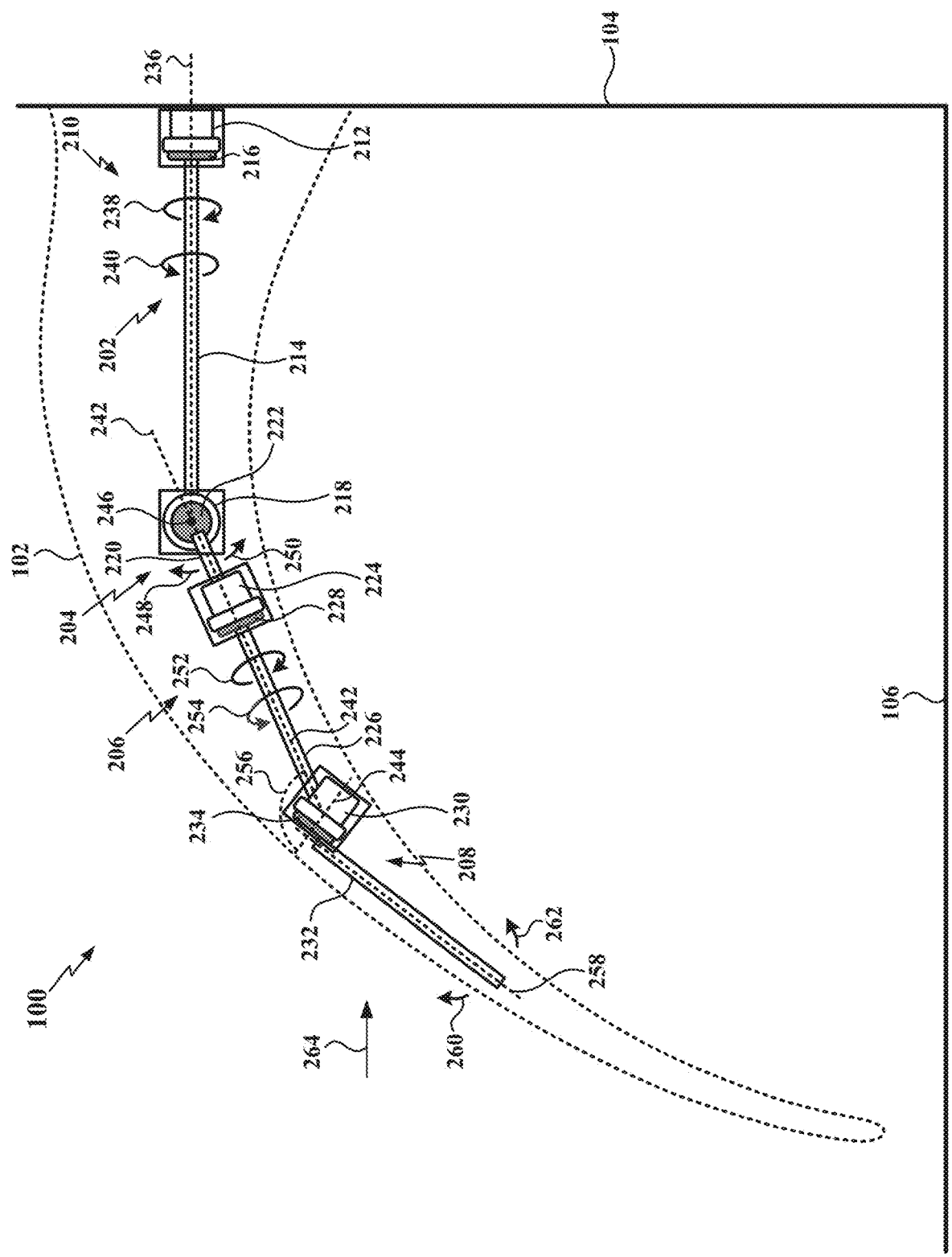
FIG. 2 illustrates a cross-sectional view of the conical-shaped articulated member shown in FIG. 1 in accordance with various aspects of the present disclosure.

FIG. 2 illustrates a cross-sectional view of the conical-shaped articulated member 100 in accordance with various aspects of the present disclosure. As shown in FIG. 2, the conical-shaped articulated member 100 may include a number of rotary actuation units 202, 204, 206, 208 disposed along a length of the conical-shaped structure 102. As described in detail herein, the rotary actuation units 202, 204, 206, 208 may be coupled together to enable movement of the conical-shaped structure 102 with multiple degrees of freedom. Although the example implementations described herein include four rotary actuation units (e.g., the rotary actuation units 202, 204, 206, 208), it should be understood that a different number of rotary actuation units may be used in other implementations. For example, the rotary actuation units 202, 204, 206, 208 in FIG. 2 may provide four degrees of freedom for the conical-shaped articulated member 100. However, if additional degrees of freedom are desired for the conical-shaped articulated member 100, five or more rotary actuation units may be used.

In some aspects of the disclosure, and as shown in FIG. 2, each of the rotary actuation units 202, 204, 206, 208 may include at least a respective rotary actuator and a respective shaft. As described herein, the shaft of a rotary actuation unit may be coupled to a housing of a rotary actuator in the rotary actuation unit or a rotating component of a rotary actuator in the rotary actuation unit. For example, and as shown in FIG. 2, the first rotary actuation unit 202 may include a first rotary actuator 212 and a first shaft 214, the second rotary actuation unit 204 may include a second rotary actuator 218 and a second shaft 220, the third rotary actuation unit 206 may include a third rotary actuator 224 and a third shaft 226, and the fourth rotary actuation unit 208 may include a fourth rotary actuator 230 and a fourth shaft 232.

In some aspects of the disclosure, one or more of the rotary actuators 212, 218, 224, 230 may be an electric rotary actuator including a rotating component, a motor for driving the rotating component, and any other optional components (e.g., gearbox, encoder, etc.) that may improve the operation and/or performance of the electric rotary actuator. The previously described electric rotary actuator may enable precise control over the rotary position of the rotating component, while providing an adequate amount of rotational speed and torque to achieve the motions (e.g., animal tail motions, vine motions, etc.) described herein. For example, one or more of the rotary actuators 212, 218, 224, 230 may include a strain wave gearing system (also referred to as a harmonic gearing system). In other aspects of the disclosure, one or more of the rotary actuators 212, 218, 224, 230 may be a hydraulic actuator.

In the example implementation of FIG. 2, the first rotary actuator 212 may include a first rotating component 216 having a first axis of rotation 236 and the second rotary actuator 218 may include a second rotating component 222 having a second axis of rotation 246. For example, the second axis of rotation 246 may extend out from the center of the second rotating component 222 perpendicular to the page of FIG. 2. As shown in FIG. 2, the first rotating component 216 may be coupled to the second rotary actuator 218 via the first shaft 214 extending along the first axis of rotation 236. In some aspects of the disclosure, the first axis of rotation 236 may be approximately perpendicular to the second axis of rotation 246. In the aspects described herein, the term "approximately perpendicular" means that an angle formed between two intersecting lines (e.g., two axes of rotation) is within a range of 85 degrees to 95 degrees. The first shaft 214 may rotate about its longitudinal axis, which may be aligned with the first axis of rotation 236. For example, the first rotary actuator 212 may rotate the first shaft 214 (e.g., via the first rotating component 216) in a first direction 238 or in a second direction 240.

The second rotating component 222 may be coupled to the third rotary actuator 224 via the second shaft 220. The third rotary actuator 224 may include a third rotating component 228 having a third axis of rotation 242. The second shaft 220 may extend along the third axis of rotation 242. In some aspects of the disclosure, the third axis of rotation 242 and a longitudinal axis of the second shaft 220 may be approximately perpendicular to the second axis of rotation 246. As shown in FIG. 2, the second shaft 220 may rotate about the second axis of rotation 246 in a first direction 248 or a second direction 250.

The third rotating component 228 may be coupled to the fourth rotary actuator 230 via the third shaft 226 extending along the third axis of rotation 242. The third shaft 226 may rotate about its longitudinal axis, which may be aligned with the third axis of rotation 242. For example, the third rotary actuator 224 may rotate the third shaft 226 (e.g., via the third rotating component 228) in a first direction 252 or in a second direction 254. The fourth rotary actuator 230 may include a fourth rotating component 234 having a fourth axis of rotation 244. In some aspects of the disclosure, an intersection of the third axis of rotation 242 and the fourth axis of rotation 244 form an obtuse angle 256. As further shown in FIG. 2, the fourth shaft 232 may be coupled to the fourth rotating component 234. In some aspects of the disclosure, a longitudinal axis 258 of the fourth shaft 232 may be approximately perpendicular to the fourth axis of rotation 244. As shown in FIG. 2, the fourth shaft 232 may rotate about the fourth axis of rotation 242 in a first direction 260 or a second direction 262.

In the aspects described herein, a linkage of rotary actuation units (e.g., the rotary actuation units 202, 204, 206, 208) may be collectively referred to as a rotary actuation unit linkage 210. Therefore, in one example scenario, a conical-shaped structure (e.g., the conical-shaped structure 102) may be designed for a particular application (e.g., for display in a ride of a theme park), and the rotary actuation unit linkage 210 may be uniquely configured for that conical-shaped structure. For example, the number of rotary actuation units, the length of each respective shaft in the rotary actuation units, the arrangement of the axes of rotations of the rotary actuators in the rotary actuation units, and/or other features of the rotary actuation unit linkage 210 may be uniquely configured to conform to the size and shape of the conical-shaped structure 102, and to achieve the desired motions for the conical-shaped articulated member 100.

In some aspects of the disclosure, two or more of the rotary actuation units in a linkage (e.g., the rotary actuation unit linkage 210) may have different orientations. In some examples, the different orientations may be offset by approximately 90 degrees (e.g., within a range of 95 degrees to 85 degrees) relative to one another. For example, the first rotary actuation unit 202 may have a first orientation, and the second rotary actuation unit 204 may have a second orientation, where the second orientation is offset by approximately 90 degrees relative to the first orientation. Accordingly, the first axis of rotation 236 of the first rotary actuator 212 may be approximately perpendicular to the second axis of rotation 246 of the second rotary actuator 218. In other examples, the different orientations may be offset by a value other than approximately 90 degrees (e.g., approximately 30 degrees).

With reference to FIG. 2, the rotary actuation units 202, 204, 206, 208 provide multiple degrees of freedom for the conical-shaped articulated member 100, which may enable for the conical-shaped articulated member 100 to perform different types of tail motions. In some aspects of the disclosure, when the first rotary actuator 212 turns in the first direction 238 or in the second direction 240, the conical-shaped structure 102 may perform a roll motion. For example, when the first rotating component 216 rotates in a certain direction (e.g., the first direction 238 or the second direction 240), the second rotary actuation unit 204 (e.g., the second rotary actuator 218 and the second shaft 220), the third rotary actuation unit 206 (e.g., the third rotary actuator 224 and the third shaft 226), and the fourth rotary actuation unit 208 (e.g., the fourth rotary actuator 230 and the fourth shaft 232) may also rotate in that direction. Accordingly, the roll motion provided by the first rotary actuation unit 202 may swing the conical-shaped structure 102 side to side (e.g., similar to the motion of a pendulum) to simulate a wagging motion of an animal's tail. An example of the wagging motion is described in detail with reference to FIG. 3.

Figure 3:
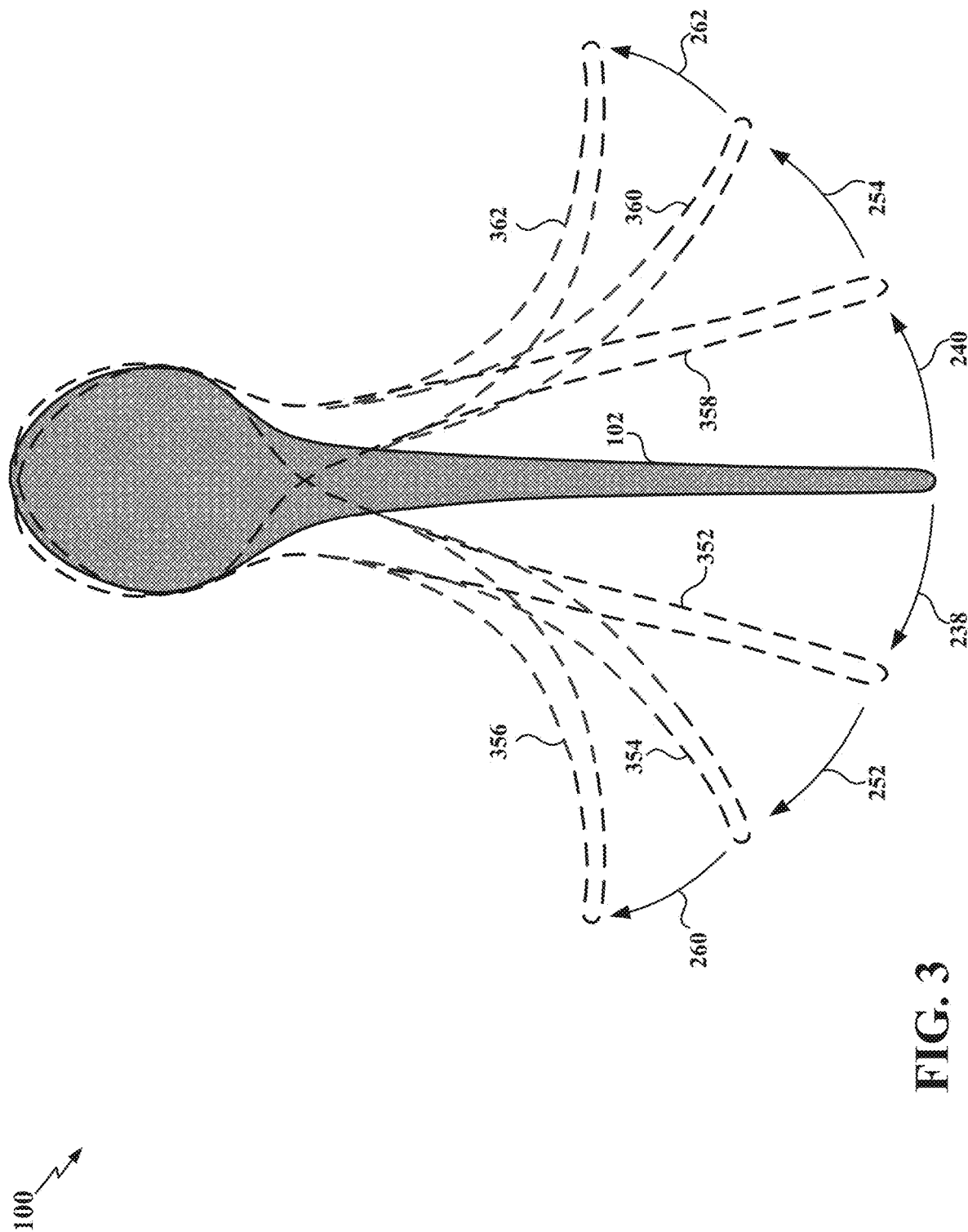
FIG. 3 illustrates a rear view of the conical-shaped articulated member in accordance with various aspects of the present disclosure.

FIG. 3 illustrates a rear view of the conical-shaped articulated member 100 in accordance with various aspects of the present disclosure. For example, the rear view of the conical-shaped articulated member 100 shown in FIG. 3 may be the view of the conical-shaped articulated member 100 looking in the direction 264 in FIG. 2. In some examples, and as shown in FIG. 3, when the first rotary actuator 212 of the first rotary actuation unit 202 rotates the first rotating component 216 approximately 15 degrees in the first direction 238, the conical-shaped articulated member 100 may perform a roll motion by moving the conical-shaped structure 102 to a first position 352. In some examples, when the third rotary actuator 224 of the third rotary actuation unit 206 rotates the third rotating component 228 approximately 15 degrees in the first direction 252, the conical-shaped articulated member 100 may perform an additional roll motion by moving the conical-shaped structure 102 to a second position 354. In some examples, when the fourth rotary actuator 230 of the fourth rotary actuation unit 208 rotates the fourth rotating component 234 approximately 15 degrees in the first direction 260, the conical-shaped articulated member 100 may perform an additional roll motion by moving the conical-shaped structure 102 to a third position 356. The conical-shaped articulated member 100 may perform the roll motions described in this example in a reverse order to return the conical-shaped structure 102 to its original position.

In other examples, and as shown in FIG. 3, when the first rotary actuator 212 of the first rotary actuation unit 202 rotates the first rotating component 216 approximately 15 degrees in the second direction 240, the conical-shaped articulated member 100 may perform a roll motion by moving the conical-shaped structure 102 to a fourth position 358. In some examples, when the third rotary actuator 224 of the third rotary actuation unit 206 rotates the third rotating component 228 approximately 15 degrees in the second direction 254, the conical-shaped articulated member 100 may perform an additional roll motion by moving the conical-shaped structure 102 to a fifth position 360. In some examples, when the fourth rotary actuator 230 of the fourth rotary actuation unit 208 rotates the fourth rotating component 234 approximately 15 degrees in the second direction 262, the conical-shaped articulated member 100 may perform an additional roll motion by moving the conical-shaped structure 102 to a sixth position 362. The conical-shaped articulated member 100 may perform the roll motions described in this example in a reverse order to return the conical-shaped structure 102 to its original position.

Therefore, in some aspects of the disclosure, the conical-shaped articulated member 100 may perform the previously described roll motions in a periodic manner to simulate a wagging motion. For example, the rotary actuation units 202, 206, 208 may move the conical-shaped structure 102 from the third position 356 to the sixth position 362 in a first sequence of roll motions, and may subsequently move the conical-shaped structure 102 from the sixth position 362 to the third position 356 in a second sequence of roll motions. The conical-shaped articulated member 100 may repeat the first and second sequence of roll motions to achieve a natural wagging motion.

In some examples, with reference to FIG. 2, when the second rotary actuator 218 of the second rotary actuation unit 204 rotates the second rotating component 222 in the first direction 248, the conical-shaped structure 102 may be lifted upwards (also referred to as increasing a pitch of the conical-shaped structure 102). When the second rotary actuator 218 of the second rotary actuation unit 204 rotates the second rotating component 222 in the second direction 250, the conical-shaped structure 102 may be dropped downwards (also referred to as decreasing the pitch of the conical-shaped structure 102). In some examples, the second rotary actuator 218 may quickly rotate the second rotating component 222 in the first direction 248 and may immediately rotate the second rotating component 222 in the second direction 250 to raise and drop the conical-shaped structure 102 to achieve a tail flicking motion.

The conical-shaped articulated member 100 may operate the rotary actuation units 202, 204, 206, 208 independently or in groups to achieve a variety of motions (e.g., different types of animal tail motions). In some examples, operation of one or more of the rotary actuation units 202, 204, 206, 208 may enable a tail wagging motion, a tail curling motion, a tail twisting motion, a tail flicking motion, a tail lifting motion, a tail dropping motion, and/or combinations thereof. In some aspects of the disclosure, the rotary actuation units 202, 204, 206, 208 may be configured to operate using different amounts of rotation and/or rotational speeds to simulate natural looking animal tail movements for the conical-shaped articulated member 100.

In some aspects of the disclosure, the rotary actuation units 202, 204, 206, 208 may be configured to perform the motions described herein (e.g., the wagging motion described with reference to FIG. 3) in response to unique command sequences (also referred to as animal tail motion profiles or animal tail performance profiles) generated by software. For example, each command sequence may control the timing and amount of rotation of one or more of the rotary actuation units 202, 204, 206, 208 to achieve a particular animal tail motion.

Figure 4:
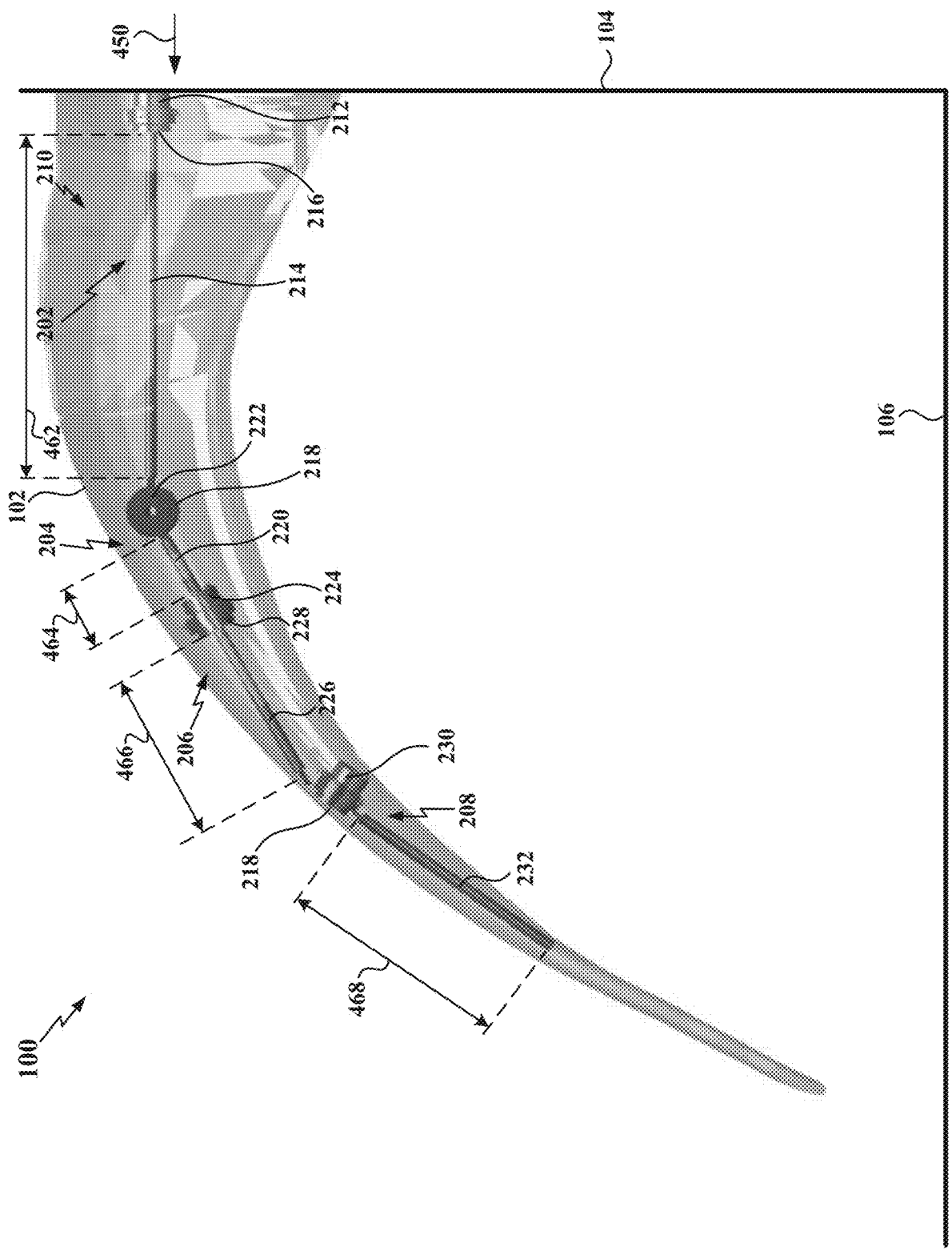
FIG. 4 illustrates a side view of an example implementation of the conical-shaped articulated member in accordance with various aspects of the present disclosure.

FIG. 4 illustrates a side view of an example implementation of the conical-shaped articulated member 100 in accordance with various aspects of the present disclosure. In FIG. 4, the conical-shaped articulated member 100 is depicted as a three-dimensional solid model showing both the conical-shaped structure 102 and the mechanical components housed inside the conical-shaped articulated member 100 (e.g., the rotary actuation units 202, 204, 206, 208). It should be understood that some portions of the conical-shaped structure 102 in FIG. 4 are intentionally rendered to appear clear or translucent to reveal the mechanical components housed inside the conical-shaped articulated member 100 and facilitate understanding of the disclosed aspects. Therefore, in some implementations, the mechanical components housed inside the conical-shaped articulated member 100 may be hidden from view as illustrated in FIG. 1.

As further shown in FIG. 4, the first shaft 214 may have a first length 462, the second shaft 220 may have a second length 464, the third shaft 226 may have a third length 466, and the fourth shaft 232 may have a fourth length 468. The values of the first length 462, the second length 464, the third length 466, and/or the fourth length 468 may be selected based on the dimensions (e.g., length, width, etc.) of the conical-shaped structure 102 and/or other physical characteristics of the conical-shaped structure 102 (e.g., a shape of the conical-shaped structure 102, a total weight of the conical-shaped structure 102, etc.). For example, and as shown in FIG. 4, the first length 462, the second length 464, the third length 466, and the fourth length 468 of the respective shafts 214, 220, 226, and 232 are configured so that the shafts 214, 220, 226, and 232 conform to the shape of the conical-shaped structure 102. In some aspects, the rotary actuation units 202, 204, 206, 208 may decrease in weight along the length of the conical-shaped structure 102. For example, the second rotary actuation unit 204 may weigh less than the first rotary actuation unit 202, the third rotary actuation unit 206 may weigh less than the second rotary actuation unit 204, and the fourth rotary actuation unit 208 may weigh less than the third rotary actuation unit 206.

It should be noted that FIG. 4 excludes any means for coupling the rotary actuation unit linkage 210 (e.g., the rotary actuation units 202, 204, 206, 208) to the conical-shaped structure 102 for ease of illustration. Aspects for coupling the rotary actuation unit linkage 210 to the conical-shaped structure 102 are described in detail herein with reference to FIGS. 6 and 7.

Figure 5:
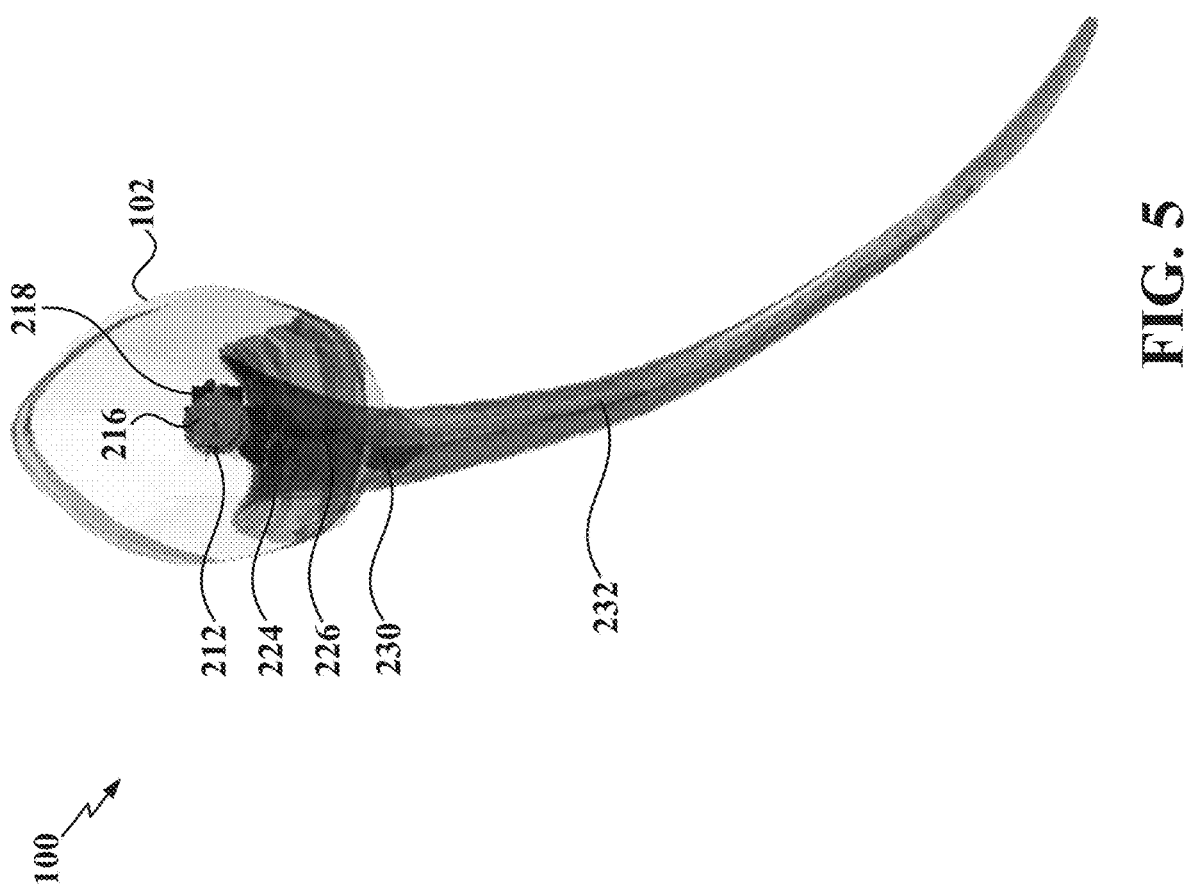
FIG. 5 illustrates a rear view of an example implementation of the conical-shaped articulated member in accordance with various aspects of the present disclosure.

FIG. 5 illustrates a rear view of an example implementation of the conical-shaped articulated member 100 in accordance with various aspects of the present disclosure. For example, the rear view of the conical-shaped articulated member 100 shown in FIG. 5 may be the view of the conical-shaped articulated member 100 looking in the direction 450 in FIG. 4. In FIG. 5, the conical-shaped articulated member 100 is depicted as a three-dimensional solid model showing both the conical-shaped structure 102 and some of the mechanical components housed inside the conical-shaped articulated member 100 (e.g., the first rotary actuator 212, the second rotary actuator 218, the third rotary actuator 224, the third shaft 226, the fourth rotary actuator 230, and the fourth shaft 232). It should be understood that some portions of the conical-shaped structure 102 in FIG. 5 are intentionally rendered to appear clear or translucent to reveal the mechanical components housed inside the conical-shaped articulated member 100 and facilitate understanding of the disclosed aspects. Therefore, in some implementations, the mechanical components housed inside the conical-shaped articulated member 100 may be hidden from view as illustrated in FIG. 3.

Figure 6:
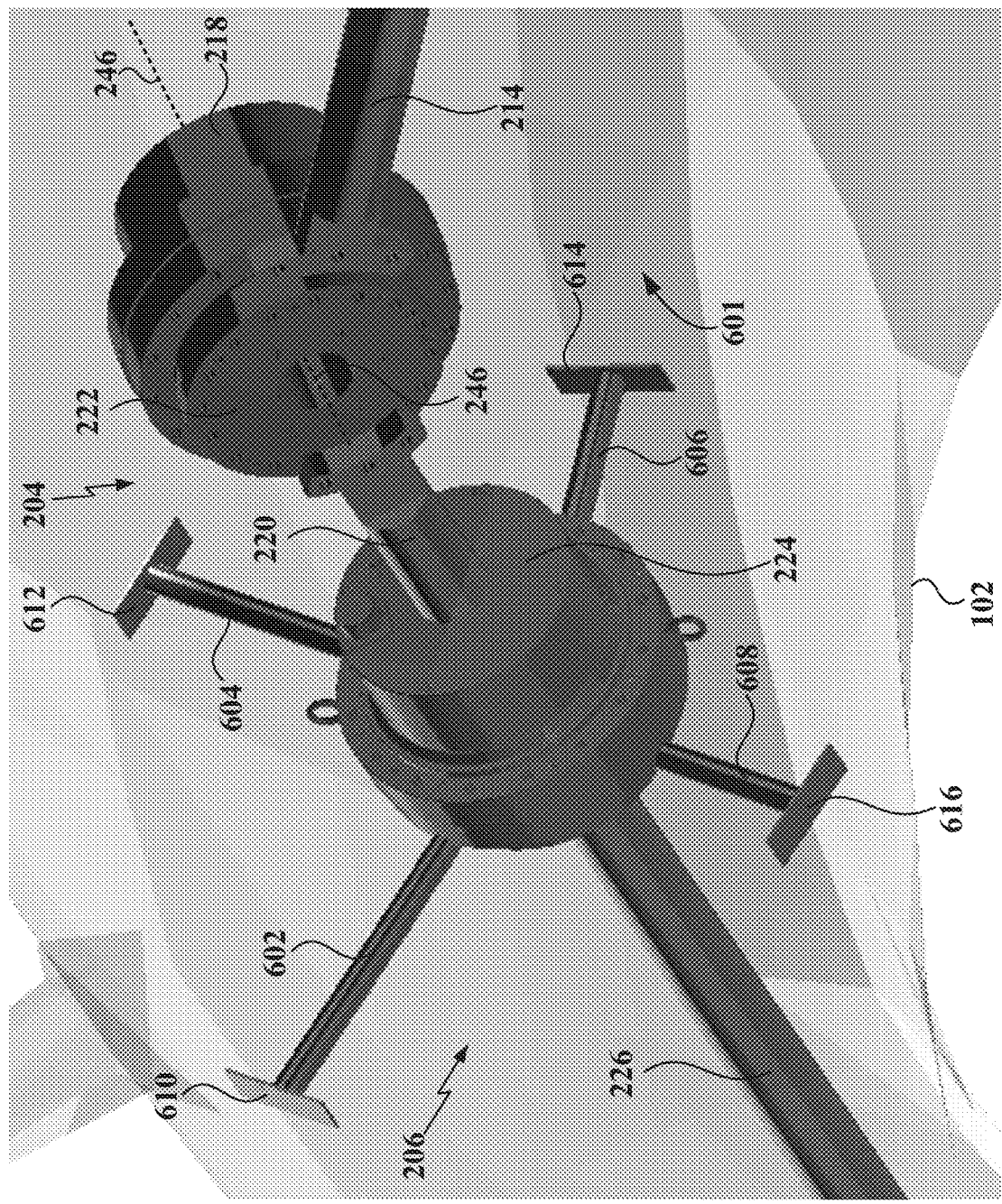
FIG. 6 illustrates a first perspective view of the second rotary actuation unit and the third rotary actuation unit in accordance with various aspects of the present disclosure.

FIG. 6 illustrates a first perspective view of the second and third rotary actuation units 204, 206 in accordance with various aspects of the present disclosure. In some aspects of the disclosure, and as shown in FIG. 6, at least one rotary actuation unit (e.g., the third rotary actuation unit 206) may include one or more support members. In other aspects of the disclosure, each rotary actuation unit (e.g., each of the rotary actuation units 202, 204, 206, 208) may include one or more support members. In some examples, a first end of a support member in a rotary actuation unit may be coupled to a rotating component of a rotary actuator (e.g., the third rotating component 228 of the third rotary actuator 224) in the rotary actuation unit. A second end of the support member may be coupled to a surface of the conical-shaped structure 102.

For example, the third rotary actuation unit 206 may include the third rotary actuator 224, the third shaft 226, a first support member 602, a second support member 604, a third support member 606, and a fourth support member 608. In some examples, the support members 602, 604, 606, 608 may be used to couple the third rotating component 228 of the third rotary actuator 224 to an inner surface 601 of the conical-shaped structure 102. In addition to providing support for the third rotary actuator 224, the support members 602, 604, 606, 608 may enable translation of the rotational movement of the third rotary actuator 224 to the conical-shaped structure 102. This may allow the conical-shaped structure 102 to more naturally exhibit the animal tail motions performed by the rotary actuation unit linkage 210. In some aspects of the disclosure, each of the support members 602, 604, 606, 608 may be coupled to a respective mounting plate 610, 612, 614, 616. In these aspects, the mounting plates 610, 612, 614, 616 may be affixed to the conical-shaped structure 102 using screws, adhesives, and/or other suitable fastening materials.

Figure 7:
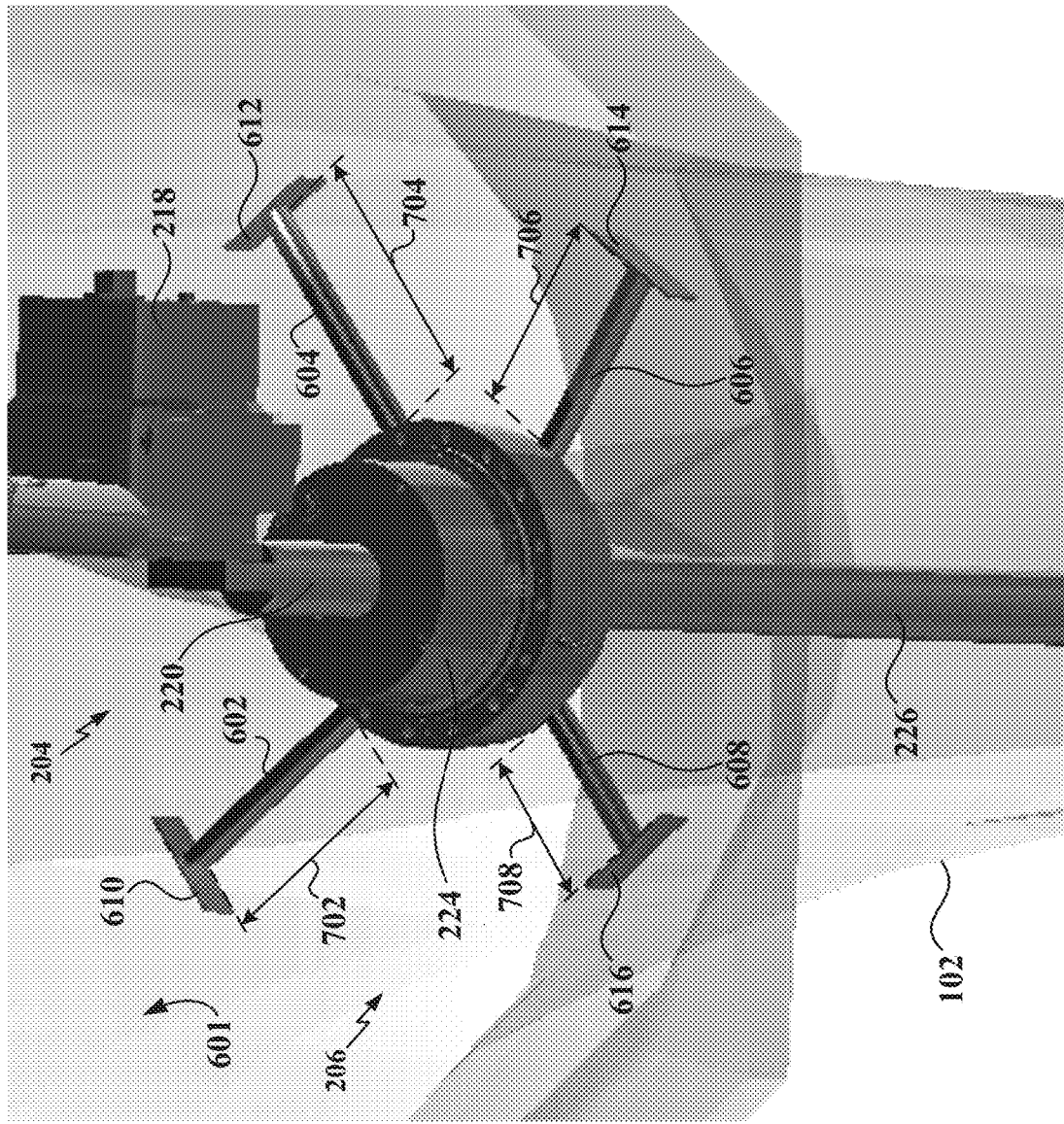
FIG. 7 illustrates a second perspective view of the second rotary actuation unit and the third rotary actuation unit in accordance with various aspects of the present disclosure.

FIG. 7 illustrates a second perspective view of the second rotary actuation unit 204 and the third rotary actuation unit 206 in accordance with various aspects of the present disclosure. As shown in FIG. 7, each of the support members 602, 604, 606, 608 may have a respective length 702, 704, 706, 708. In some implementations, some of the lengths 702, 704, 706, 708 of the support members 602, 604, 606, 608 may be different from one another to accommodate the size and/or shape of the conical-shaped structure 102. In one example, the lengths 702, 704 of the first and second support members 602, 604 may be 11 inches, the length 706 of the third support member 606 may be 8 inches, and the length 708 of the fourth support member 608 may be 6.5 inches.

Considering the aspects described herein, it can be appreciated that the number of rotary actuation units, the length of each respective shaft in the rotary actuation units, and the arrangement of the rotary actuators and shafts may be appropriately configured to accommodate a unique design of a conical-shaped structure and/or to support the desired types of motions for the conical-shaped articulated member 100. Moreover, the modular components (e.g., rotary actuation units 202, 204, 206, 208) of the conical-shaped articulated member 100 described herein may provide flexibility and facilitate customization for various designs of conical-shaped structures. The aspects described herein allow the use of a same type of rotary actuator (which may be configured differently in each rotary actuation unit) to provide multiple degrees of freedom for the conical-shaped articulated member 100. Since the rotary actuation units described herein may perform the desired motions for a conical-shaped articulated member (e.g., conical-shaped articulated member 100), the aspects described herein may avoid the use of cables and/or other additional mechanisms that may be significantly more costly, less durable, and/or more difficult to maintain.

Figure 8:
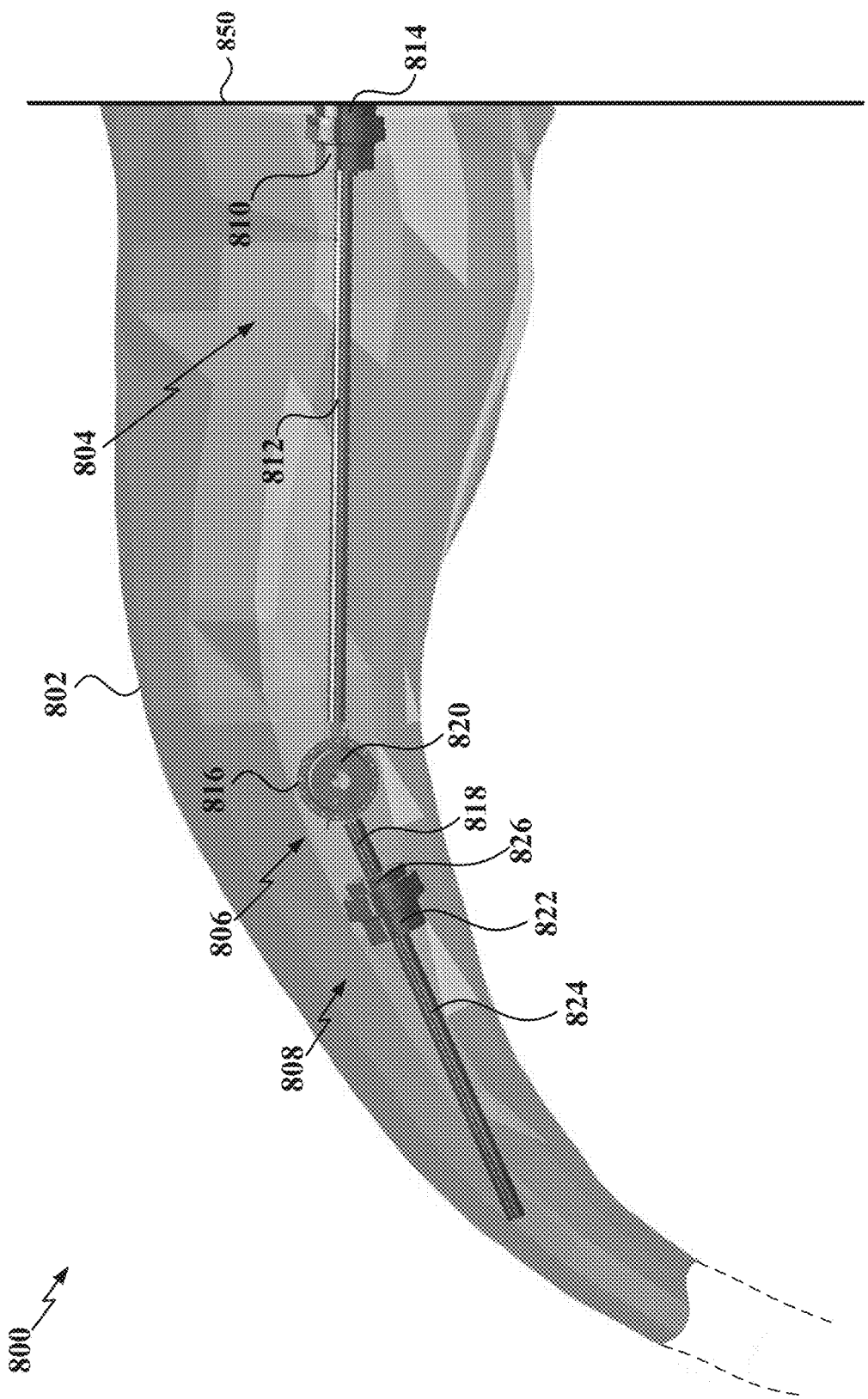
FIG. 8 illustrates a side view of an example implementation of a conical-shaped articulated member in accordance with various aspects of the present disclosure.

FIG. 8 illustrates a side view of an example implementation of a conical-shaped articulated member 800 in accordance with various aspects of the present disclosure. In FIG. 8, the conical-shaped articulated member 800 is depicted as a three-dimensional solid model showing both the conical-shaped structure 802 and the mechanical components housed inside the conical-shaped articulated member 800 (e.g., rotary actuation units 804, 806, 808). It should be understood that some portions of the conical-shaped structure 802 in FIG. 8 are intentionally rendered to appear clear or translucent to reveal the mechanical components housed inside the conical-shaped articulated member 800 and facilitate understanding of the disclosed aspects. Therefore, in some implementations, the mechanical components housed inside the conical-shaped articulated member 800 may be hidden from view.

As shown in FIG. 8, the first rotary actuation unit 804 includes a first rotary actuator 810 and a first shaft 812, the second rotary actuation unit 806 includes a second rotary actuator 816 and a second shaft 818, and the third rotary actuation unit 808 includes a third rotary actuator 822 and a third shaft 824. As shown in FIG. 8, a first rotating component 814 of the first rotary actuator 810 may be coupled to a surface 850 and a first end of the first shaft 812 may be coupled to a housing of the first rotary actuator 810. As further shown in FIG. 8, a second end of the first shaft 812 may be coupled to a housing of the second rotary actuator 816. A first end of the second shaft 818 may be coupled to the second rotating component 820 and a second end of the second shaft 818 may be coupled to a third rotating component 826 of the third rotary actuator 822. The third shaft 824 may be coupled to a housing of the third rotary actuator 822.

In the aspect of FIG. 8, the conical-shaped articulated member 800 is implemented as an animal's tail. Accordingly, the rotary actuation units 804, 806, 808 may achieve various tail motions. In some examples, the first rotary actuation unit 804 may rotate the second and third rotary actuation units 806, 808, while the second actuation unit 806 may raise and lower the third rotary actuation unit 808. It should be noted that FIG. 8 excludes any means for coupling the rotary actuation units 804, 806, 808 to the conical-shaped structure 802 for ease of illustration. However, at least one of the rotary actuation units 804, 806, 808 may include one or more support members for coupling to a surface of the conical-shaped structure 802 as previously described with reference to FIGS. 6 and 7.

Figure 9:
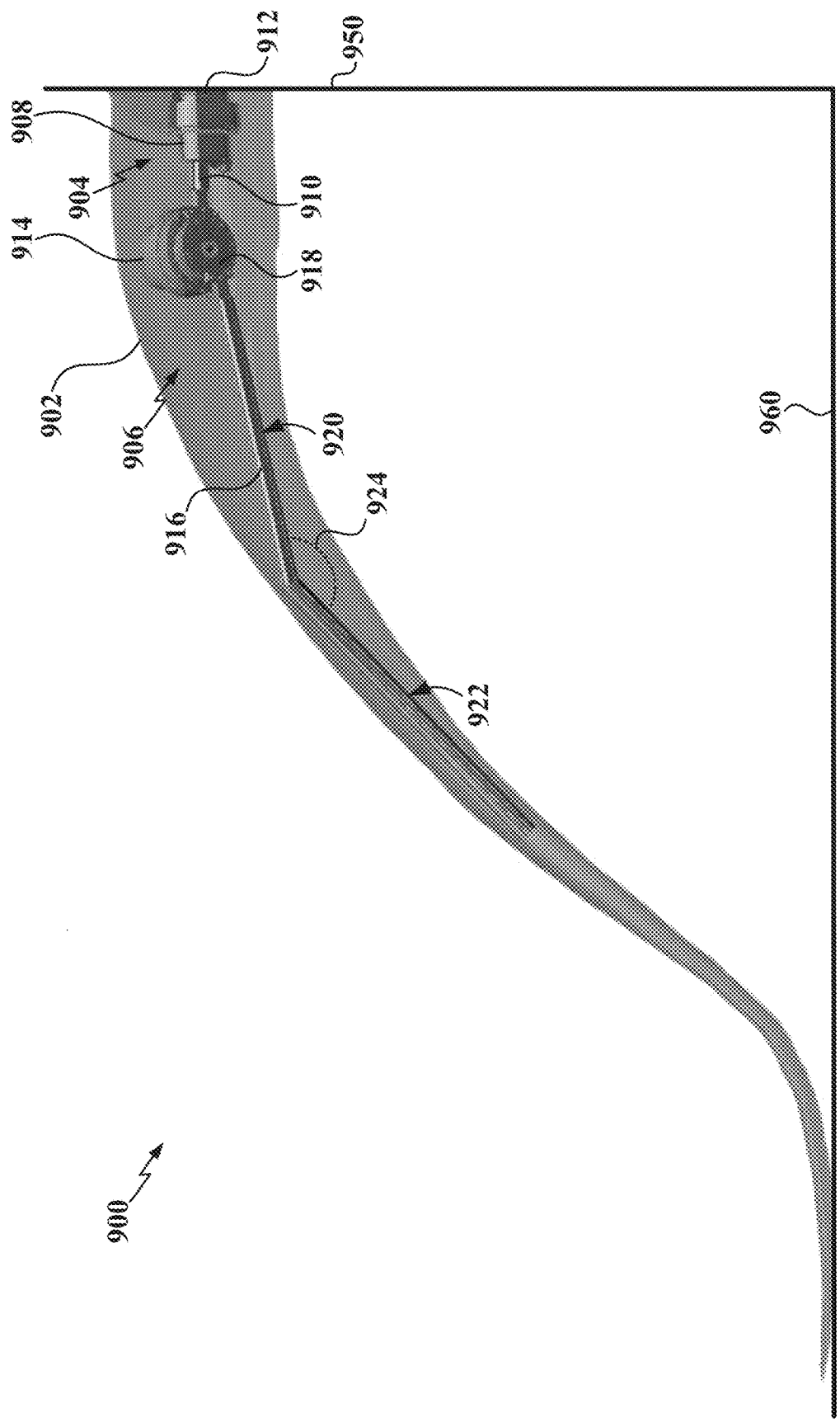
FIG. 9 illustrates a side view of an example implementation of a conical-shaped articulated member in accordance with various aspects of the present disclosure.

FIG. 9 illustrates a side view of an example implementation of a conical-shaped articulated member 900 in accordance with various aspects of the present disclosure. In FIG. 9, the conical-shaped articulated member 900 is depicted as a three-dimensional solid model showing both the conical-shaped structure 902 and the mechanical components housed inside the conical-shaped articulated member 900 (e.g., rotary actuation units 904, 906). It should be understood that some portions of the conical-shaped structure 902 in FIG. 9 are intentionally rendered to appear clear or translucent to reveal the mechanical components housed inside the conical-shaped articulated member 800 and facilitate understanding of the disclosed aspects. Therefore, in some implementations, the mechanical components housed inside the conical-shaped articulated member 900 may be hidden from view.

As shown in FIG. 9, the first rotary actuation unit 904 includes a first rotary actuator 908 and a first shaft 910, and the second rotary actuation unit 906 includes a second rotary actuator 914 and a second shaft 916. As shown in FIG. 9, a first rotating component 912 of the first rotary actuator 908 may be coupled to a surface 950 and a first end of the first shaft 910 may be coupled to a housing of the first rotary actuator 908. As further shown in FIG. 9, a second end of the first shaft 910 may be coupled to a housing of the second rotary actuator 914. In some examples, the conical-shaped articulated member 900 may be suspended above a floor 960 or partially suspended above the floor 960 (as shown in FIG. 9).

In the aspect of FIG. 9, the first rotary actuation unit 904 may rotate the second rotary actuation unit 906. The second rotary actuator 914 of the second rotary actuation unit 906 may move (e.g., raise or drop) the shaft 916. As shown in FIG. 9, the second shaft 916 may have a shape that conforms to the shape of the conical-shaped structure 902. For example, as shown in FIG. 9, the second shaft 916 may include first and second portions 920, 922 configured to form an angle 924 appropriate for the shape the conical-shaped structure 902.

It should be noted that FIG. 9 excludes any means for coupling the rotary actuation units 904, 906 to the conical-shaped structure 902 for ease of illustration. However, at least one of the rotary actuation units 904, 906 may include one or more support members for coupling to a surface of the conical-shaped structure 902 as described with reference to FIGS. 6 and 7.

As previously described, in the aspect of FIG. 9, the conical-shaped articulated member 900 is implemented as an articulated vine. Accordingly, the rotary actuation units 904, 906 may achieve various motions (also referred to as vine motions) that enable the conical-shaped articulated member 900 (which may have the shape and appearance of a vine as shown in FIG. 9) to perform life-like movements.

Figure 10:
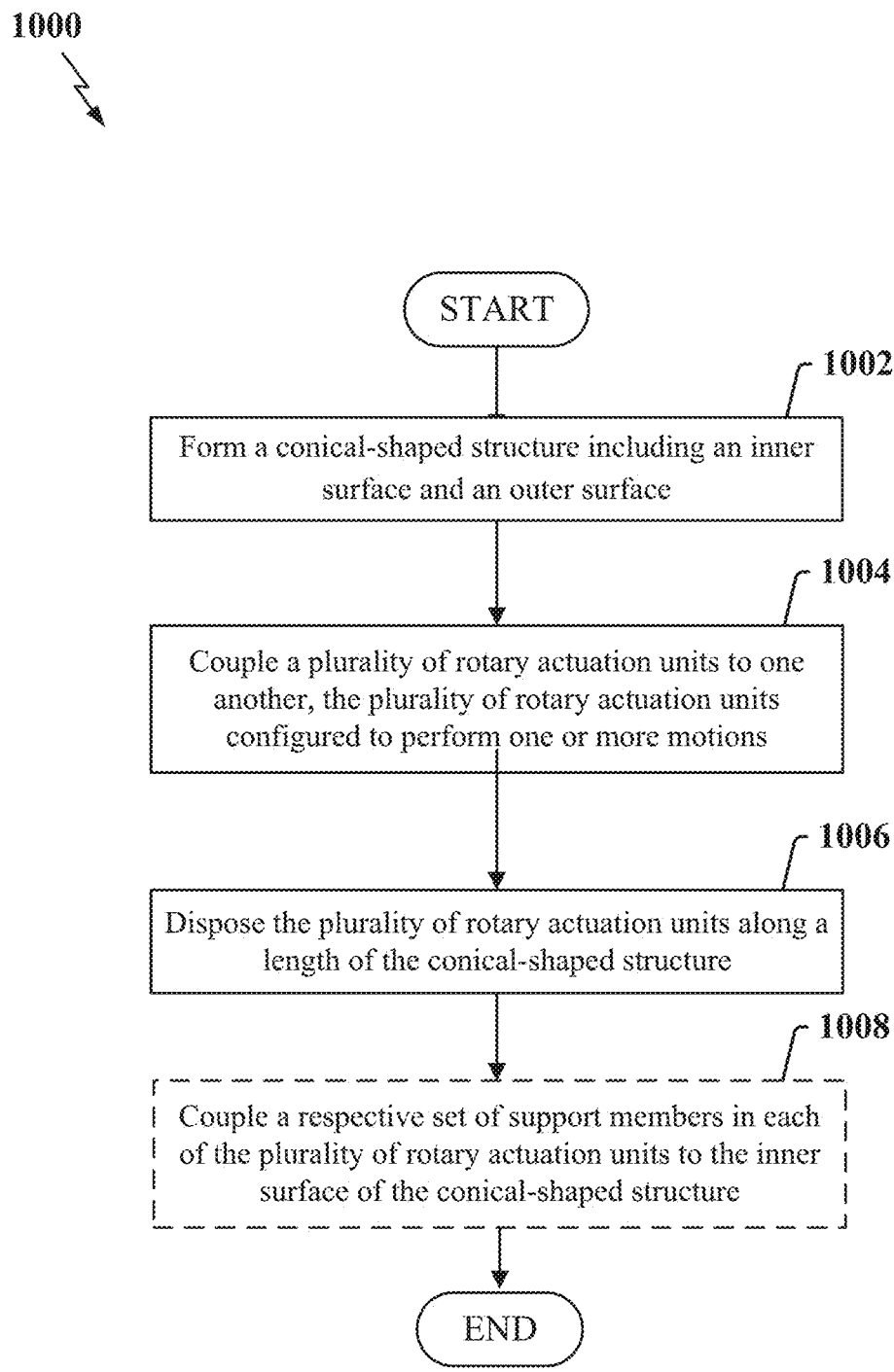
FIG. 10 is a flow chart illustrating an exemplary process for constructing a conical-shaped articulated member in accordance with various aspects of the present disclosure.

FIG. 10 is a flow chart illustrating an exemplary process 1000 for constructing a conical-shaped articulated member according to an aspect of the present disclosure. As described below, some or all illustrated features may be omitted in a particular implementation within the scope of the present disclosure, and some illustrated features may not be required for implementation of all embodiments. In some examples, the process 1000 may be carried out by any suitable apparatus or means for carrying out the operations described below. In FIG. 10, optional blocks are indicated with dashed lines.

At block 1002, the process involves forming a conical-shaped structure (e.g., the conical-shaped structure 102, 802, 902) including an inner surface and an outer surface.

At block 1004, the process involves coupling a plurality of rotary actuation units to one another. The plurality of rotary actuation units are configured to perform one or more motions. In some aspects, the plurality of rotary actuation units may provide multiple degrees of freedom for the conical-shaped articulated member. For example, and as shown in FIG. 2, coupling the plurality of rotary actuation units may include coupling a first rotary actuation unit (e.g., first rotary actuation unit 202) to a second rotary actuation unit (e.g., second rotary actuation unit 204). The first rotary actuation unit may include a first rotary actuator (e.g., the first rotary actuator 212) and a first shaft (e.g., the first shaft 214), the first shaft being coupled to a first rotating component (e.g., the first rotating component 216) of the first rotary actuator. The first rotating component may have a first axis of rotation (e.g., the first axis of rotation 236). The second rotary actuation unit of the plurality of rotary actuation units may include a second rotary actuator (e.g., the second rotary actuator 218) and a second shaft (e.g., the second shaft 220), the second shaft being coupled to a second rotating component (e.g., the second rotating component 222) of the second rotary actuator. The second rotating component may have a second axis of rotation (e.g., the second axis of rotation 246). The first rotating component may be coupled to the second rotary actuator via the first shaft extending along the first axis of rotation, the first axis of rotation being approximately perpendicular to the second axis of rotation.

In some aspects of the disclosure, coupling the plurality of rotary actuation units may further include coupling the second rotary actuation unit to a third rotary actuation unit (e.g., the third rotary actuation unit 206). The third rotary actuation unit may include a third rotary actuator (e.g., the third rotary actuator 224) and a third shaft (e.g., the third shaft 226), where the third shaft is coupled to a third rotating component (e.g., the third rotating component 228) of the third rotary actuator. The third rotating component may have a third axis of rotation (e.g., the third axis of rotation 242). The second rotating component may be coupled to the third rotary actuator via the second shaft extending along the third axis of rotation, the third axis of rotation being approximately perpendicular to the second axis of rotation.

In some aspects of the disclosure, coupling the plurality of rotary actuation units may further include coupling the third rotary actuation unit to a fourth rotary actuation unit (e.g., the fourth rotary actuation unit 208). The fourth rotary actuation unit may include a fourth rotary actuator (e.g., the fourth rotary actuator 230) and a fourth shaft (e.g., the fourth shaft 232), the fourth shaft coupled to a fourth rotating component (e.g., the fourth rotating component 234) of the fourth rotary actuator. The fourth rotating component may have a fourth axis of rotation (e.g., the fourth axis of rotation 244). The third rotating component may be coupled to the fourth rotary actuator via the third shaft extending along the third axis of rotation, wherein the third axis of rotation and the fourth axis of rotation form an obtuse angle.

In some aspects of the disclosure, the one or more motions may include at least a roll motion and a pitch motion (e.g., a pitch motion that lifts or drops the conical-shaped structure 102). For example, at least a first rotary actuation unit (e.g., the first rotary actuation unit 202, the third rotary actuation unit 206, and/or the fourth rotary actuation unit 208) of the plurality of rotary actuation units provides the roll motion for the conical-shaped articulated member. For example, at least a second rotary actuation unit (e.g., the second rotary actuation unit 204) of the plurality of rotary actuation units may provide the pitch motion for the conical-shaped articulated member.

At block 1006, the process involves disposing the plurality of rotary actuation units along a length (e.g., the length 110 in FIG. 1) of the conical-shaped structure (e.g., the conical-shaped structure 102). For example, and as shown in FIGS. 1 and 2, the first rotary actuation unit 202, the second rotary actuation unit 204, the third rotary actuation unit 206, and the fourth rotary actuation unit 208 may be disposed along the length 110 of the conical-shaped structure 102.

At block 1008, the process involves coupling a respective set of support members (e.g., support members 602, 604, 606, 608 in FIGS. 6 and 7) in each of the plurality of rotary actuation units to the inner surface of the conical-shaped structure. In some aspects of the disclosure, each support member in a set of support members (e.g., support rods) of a rotary actuation unit includes a first end and a second end. In some examples, a first end of a support member in a rotary actuation unit may be coupled to a rotating component of a rotary actuator (e.g., the third rotating component 228 of the third rotary actuator 224) in the rotary actuation unit. A second end of the support member may be coupled to a surface (e.g., an inner surface) of the conical-shaped structure 102. In some examples, the second end may be coupled to a shaft (e.g., the third shaft 226) of a rotary actuation unit instead of the rotating component of a rotary actuator (e.g., the third rotating component 228 of the third rotary actuator 224) in the rotary actuation unit. In some aspects, at least two support members in a set of support members in a rotary actuation unit have different lengths.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object.

One or more of the components, steps, features and/or functions illustrated in FIGS. 1-9 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A conical-shaped articulated member, comprising:
   a conical-shaped structure including an inner surface and an outer surface, wherein the conical-shaped structure comprises at least a skin, an air bag, or a textile; and
   a plurality of rotary actuation units disposed along a length of the conical-shaped structure, wherein at least two rotary actuation units of the plurality of rotary actuation units are coupled together, and wherein the plurality of rotary actuation units are configured to perform one or more motions,
   wherein each rotary actuation unit of the plurality of rotary actuation units includes a plurality of support rods fixed thereto, each support rod of the plurality of support rods including a first end and a second end, wherein the first end is fixed to the inner surface of the skin, the air bag, or the textile.

2. The conical-shaped articulated member of claim 1, wherein each rotary actuation unit of the plurality of rotary actuation units includes a rotary actuator and a shaft, wherein the shaft is coupled to the rotary actuator.

3. The conical-shaped articulated member of claim 1, wherein the second end is coupled to:
   a rotating component of a rotary actuator of a rotary actuation unit, or
   a shaft of the rotary actuation unit.

4. The conical-shaped articulated member of claim 3, wherein at least two support rods of the plurality of support rods have different lengths.

5. The conical-shaped articulated member of claim 1, wherein a first rotary actuation unit of the at least two rotary actuation units has a first orientation, and a second rotary actuation unit of the at least two rotary actuation units has a second orientation.

6. The conical-shaped articulated member of claim 5, wherein the second orientation is offset by approximately 90 degrees relative to the first orientation.

7. The conical-shaped articulated member of claim 1, wherein the plurality of rotary actuation units decrease in weight along the length of the conical-shaped structure.

8. The conical-shaped articulated member of claim 1, wherein the conical-shaped structure further comprises at least a shell.

9. The conical-shaped articulated member of claim 1, wherein
   a first rotary actuation unit of the plurality of rotary actuation units includes a first rotary actuator and a first shaft, the first shaft coupled to a first rotating component of the first rotary actuator, the first rotating component having a first axis of rotation,
   a second rotary actuation unit of the plurality of rotary actuation units includes a second rotary actuator and a second shaft, the second shaft coupled to a second rotating component of the second rotary actuator, the second rotating component having a second axis of rotation, and
   the first rotating component is coupled to the second rotary actuator via the first shaft extending along the first axis of rotation, the first axis of rotation being approximately perpendicular to the second axis of rotation.

10. The conical-shaped articulated member of claim 9, wherein
   a third rotary actuation unit of the plurality of rotary actuation units includes a third rotary actuator and a third shaft, the third shaft coupled to a third rotating component of the third rotary actuator, the third rotating component having a third axis of rotation, and
   the second rotating component is coupled to the third rotary actuator via the second shaft extending along the third axis of rotation, the third axis of rotation being approximately perpendicular to the second axis of rotation.

11. The conical-shaped articulated member of claim 10, wherein
   a fourth rotary actuation unit of the plurality of rotary actuation units includes a fourth rotary actuator and a fourth shaft, the fourth shaft coupled to a fourth rotating component of the fourth rotary actuator, the fourth rotating component having a fourth axis of rotation, and
   the third rotating component is coupled to the fourth rotary actuator via the third shaft extending along the third axis of rotation, wherein the third axis of rotation and the fourth axis of rotation form an obtuse angle.

12. The conical-shaped articulated member of claim 11, wherein a longitudinal axis of the fourth shaft is approximately perpendicular to the fourth axis of rotation.

13. The conical-shaped articulated member of claim 1, wherein the one or more motions includes at least a roll motion and a pitch motion, and wherein:
   at least a first rotary actuation unit of the at least two rotary actuation units provides the roll motion for the conical-shaped articulated member, and
   at least a second rotary actuation unit of the at least two rotary actuation units provides the pitch motion for the conical-shaped articulated member.

14. The conical-shaped articulated member of claim 1, wherein the plurality of rotary actuation units provide multiple degrees of freedom for the conical-shaped articulated member.

15. A method for constructing a conical-shaped articulated member, the method comprising:
- forming a conical-shaped structure including an inner surface and an outer surface, wherein the conical-shaped structure comprises at least a skin, an air bag, or a textile;
- coupling a plurality of rotary actuation units to one another, the plurality of rotary actuation units configured to perform one or more motions, wherein each rotary actuation unit of the plurality of rotary actuation units includes a plurality of support rods fixed thereto, each support rod of the plurality of support rods including a first end and a second end;
- disposing the plurality of rotary actuation units along a length of the conical-shaped structure; and
- fixing the first end of each support rod of the plurality of support rods to the inner surface of the skin, the air bag, or the textile.

16. The method of claim 15, wherein the coupling the plurality of rotary actuation units comprises:
- coupling a first rotary actuation unit of the plurality of rotary actuation units to a second rotary actuation unit of the plurality of rotary actuation units,
- wherein the first rotary actuation unit of the plurality of rotary actuation units includes a first rotary actuator and a first shaft, the first shaft being coupled to a first rotating component of the first rotary actuator, the first rotating component having a first axis of rotation,
- wherein the second rotary actuation unit of the plurality of rotary actuation units includes a second rotary actuator and a second shaft, the second shaft being coupled to a second rotating component of the second rotary actuator, the second rotating component having a second axis of rotation, and
- wherein the first rotating component is coupled to the second rotary actuator via the first shaft extending along the first axis of rotation, the first axis of rotation being approximately perpendicular to the second axis of rotation.

17. The method of claim 16, wherein the coupling the plurality of rotary actuation units further comprises:
- coupling the second rotary actuation unit to a third rotary actuation unit,
- wherein the third rotary actuation unit includes a third rotary actuator and a third shaft, the third shaft coupled to a third rotating component of the third rotary actuator, the third rotating component having a third axis of rotation, and
- wherein the second rotating component is coupled to the third rotary actuator via the second shaft extending along the third axis of rotation, the third axis of rotation being approximately perpendicular to the second axis of rotation.

18. The method of claim 17, wherein the coupling the plurality of rotary actuation units further comprises:
- coupling the third rotary actuation unit to a fourth rotary actuation unit, the fourth rotary actuation unit including a fourth rotary actuator and a fourth shaft, the fourth shaft coupled to a fourth rotating component of the fourth rotary actuator, the fourth rotating component having a fourth axis of rotation, and
- wherein the third rotating component is coupled to the fourth rotary actuator via the third shaft extending along the third axis of rotation, wherein the third axis of rotation and the fourth axis of rotation form an obtuse angle.

19. The method of claim 18, further comprising:
- coupling the second end of each support rod of the plurality of support rods to:
  - a rotating component of a rotary actuator of a rotary actuation unit, or
  - a shaft of the rotary actuation unit.

20. The method of claim 19, wherein the one or more motions includes at least a roll motion and a pitch motion, and wherein:
- at least the first rotary actuation unit of the plurality of rotary actuation units provides the roll motion for the conical-shaped articulated member, and
- at least the second rotary actuation unit of the plurality of rotary actuation units provides the pitch motion for the conical-shaped articulated member.

* * * * *